Sept. 15, 1964 A. P. FRAAS 3,149,047
RESILIENT MODERATOR STRUCTURE FOR NEUTRONIC REACTORS
Filed July 11, 1961 2 Sheets-Sheet 1

INVENTOR.
Arthur P. Fraas
BY

ATTORNEY.

Sept. 15, 1964  A. P. FRAAS  3,149,047
RESILIENT MODERATOR STRUCTURE FOR NEUTRONIC REACTORS
Filed July 11, 1961  2 Sheets-Sheet 2

INVENTOR.
Arthur P. Fraas
BY
ATTORNEY.

United States Patent Office 3,149,047
Patented Sept. 15, 1964

3,149,047
RESILIENT MODERATOR STRUCTURE FOR NEUTRONIC REACTORS
Arthur P. Fraas, Knoxville, Tenn., assignor to the United States of America as represented by the United States Atomic Energy Commission
Filed July 11, 1961, Ser. No. 123,318
4 Claims. (Cl. 176—85)

The present invention relates generally to neutronic reactors, and more particularly to a novel moderator structure for gas-cooled, graphite-moderated neutronic reactors.

The moderator structure of graphite-moderated gas-cooled reactors usually takes the form of a stacked assembly of graphite blocks, through which vertically pass a multiplicity of aligned channels for the disposition of fuel, the conduction of a gaseous coolant, and for the acceptance of neutron-absorbing control rods. Such structures are usually quite large and are supported from below by an apertured, metallic (usually steel) grid.

To insure that misalignment of the penetrating channels does not result from externally-imposed lateral forces, the structures must be held in a closely-packed condition. In the past, this has been accomplished by encircling the periphery of the reactor core with a series of spring-loaded restraining bands (also, usually fabricated from steel) which exert forces radially inwardly on the core.

Reactors of the character described are assembled at normal room temperatures but are operated at much higher temperatures. Due to the difference between the coefficients of thermal expansion of moderator materials such as graphite and structural materials such as steel, the structural material expands more than the moderator material. Thus, the moderator assembly and the vertically penetrating channels become misaligned with respect to the apertures of the metallic grid supporting the core from below. In addition, the peripheral supporting structure tends to grow away from the core. In prior reactors, peripheral growth has been accommodated by the aforementioned, spring-loaded restraining bands.

Moreover, graphite shrinks under fast-neutron irradiation at high temperatures, whereas steel is, essentially, unaffected dimensionally under similar conditions. Therefore, additional differential dimensional changes must be accommodated by the aforementioned spring-loaded restraining bands, and the misalignment of the core with respect to the supporting grid is accentuated.

The problem of misalignment between the core and its supporting grid has, in the past, been alleviated by introducing such complications as small plates sliding on ball bearings or by designing the grid to be in alignment with the core at the design operating temperature of the reactor. These solutions are, however, deficient in that they are complex and expensive or in that proper alignment exists only at the design operating temperature for some particular phase of the reactor life and misalignment exists at all other temperatures and phases of the operating life.

The peripheral, spring-loaded restraining bands which have, heretofore, been used to hold moderator structures in a closely packed condition are also seriously deficient. These springs are located in a region of high temperature under high stresses, and in this condition tend to lose their resiliency. In this manner, the radially inward forces which hold the core together diminish with time. Thus this type of device is not well suited for operation at the high temperatures desired for use with all-ceramic reactors.

It is, therefore, a general object of the present invention to provide a neutronic reactor which is not affected by differences in coefficients of thermal expansion between moderator and structural materials.

Another major object of the invention is to provide a reactor core which is not dependent on stressed metal springs for lateral support.

A further object of the invention is to provide a reactor core structure, the alignment of which, with respect to its supporting grid, is not affected by changes in temperature.

A further object of the invention is to provide a reactor core structure, the alignment of which, with respect to its supporting grid, is not affected by irradiation-induced changes in dimension.

A still further object of the invention is to provide a graphite core structure supported from below by a steel grid, which structure is not dependent on highly-stressed springs for lateral support and the alignment of which, with respect to its supporting grid, is not affected by thermal or irradiation-induced dimensional changes.

Other objects of the invention will become apparent from an examination of the following description of the invention and the drawings appended thereto, in which.

Figure 1:
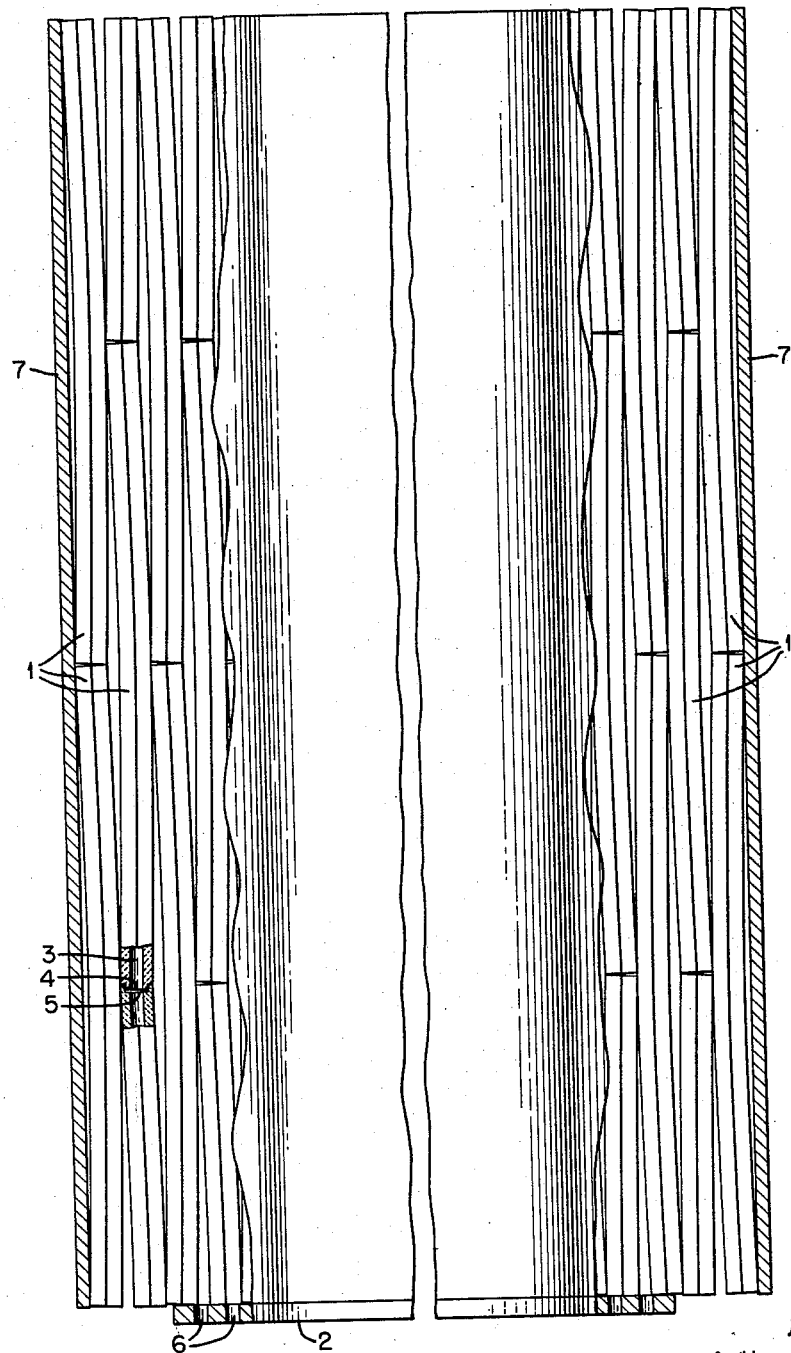
FIGURE 1 is a vertical section of a reactor moderator structure to which the present invention has been applied.

In accordance with the principles of the present invention, the above objects are attained by providing a moderator-core structure of the character described in which at least a portion of the moderator blocks in the structure are under longitudinal bending stresses, and the structure is held at its periphery by rigid restraining means. In structures designed in accordance with the present invention, the moderator, being in a stressed condition, supplies its own lateral restraining force. In other words, the stressed blocks in the structure push laterally against each other and against the rigid peripheral restraining means. The invention is based upon the realization that a stressed moderator structure retained by rigid peripheral restraining means obviates the disadvantages associated with the use of metal spring-loaded restraining means holding an unstressed moderator structure. Graphite is particularly suitable for such a structure since it has a low modulus of elasticity and retains its strength and creep resistance to temperatures above 3500° F.

Although the necessary lateral force can be supplied by providing a structure in which only a portion of the blocks are in a stressed condition, for reasons which will be explained below, it is preferred that all blocks in the structure be in a stressed condition. Moreover, as will also be explained below, it is preferred that when assembled initially each block be under a tensile stress at a side near the periphery of the structure and under a compressive stress at the side opposite thereto near the center of the core.

Structures constructed according to the invention are advantageous over prior structures in several respects. First, no reliance is placed on highly-stressed metal springs for the provision of the lateral forces required to hold the structure together. Secondly, the effects of differential expansion are obviated. With respect to differential thermal expansion, the moderator structure, being in stressed condition, "grows" radially with the surrounding structural material. Thus, the entire structure expands radially as if it were composed entirely of the structural material. In a similar manner, differential dimensional changes caused by irradiation are accommodated.

When all blocks in the structure are stressed in the same direction to the same degree, as is preferable, the radial growth of the structure is distributed uniformly between blocks. Thus, channels in the structure which are aligned with apertures in a supporting grid will remain in alignment therewith irrespective of differential dimension changes.

When the blocks are graphite and are stressed so as to be in tension on a peripheral side and in compression on the opposite inner side, an appreciable and fortuitous increase in the lifetime of the graphite results. As was mentioned above, graphite shrinks under influence of fast neutron irradiation at high temperatures. In a finite reactor, the fast neutron flux varies radially, the highest intensity being at the center of the core, and the lowest at the periphery. Thus, each block in the core is subjected to a transverse fast-flux gradient. Since the degree of shrinkage is proportional to the magnitude of the fast flux, such a transverse flux gradient produces differential shrinkage within the moderator blocks; each block shrinks less on its peripheral side than on its side nearest to the center of the core. Resulting from this phenomenon is an internal stress within each block which increases with time until cracking of the block occurs. When the blocks are prestressed and oriented as is prescribed in the most preferable form of the present invention, the initial effect of the fast flux gradient is merely to relieve the stress. Thus, an appreciable increase in the lifetime of the graphite is realized.

The problems resulting from fast-neutron-induced shrinkage are more fully discussed in assignee's United States Patent 3,100,187, filed May 3, 1961, for "Reflector for Neutronic Reactors." As is stated in that application, the fast flux gradient in a reactor is greatest at the periphery of the reactor core. Thus, in the most preferable form of the present invention, the moderator blocks which are situated in regions of the core where high fast flux gradients are encountered (usually at the periphery) are prestressed to a greater degree than blocks located in other regions.

The above-described core of prestressed moderator blocks may be assembled in any convenient manner. One suitable method consists of forming each block with a slight curvature, the magnitude of which is sufficient to produce the required degree of stress upon being straightened, and assembling these bowed blocks into a stacked assembly. The resultant assembly is then cinched to a closely-packed condition in a manner similar to the compression of piston rings into the grooves of a piston of an internal combustion engine. The bowed blocks are thus straightened and placed in a stressed condition.

Alternatively, a number of bowed blocks can be assembled into a cluster, the cluster straightened in a press, and the blocks cemented together while in this condition with a thermally-sensitive, preferably low-ash cement, such as methyl methacrylate. All blocks for the reactor are formed into cemented bundles of blocks in this manner, and the bundles are placed within a rigid sleeve which defines the periphery of the reactor core. After assembly, the temperature of the core is raised to a point sufficient to vaporize or decompose the cement, thereby releasing the blocks to push against each other and the peripheral sleeve and laterally loading the structure.

Figure 4:
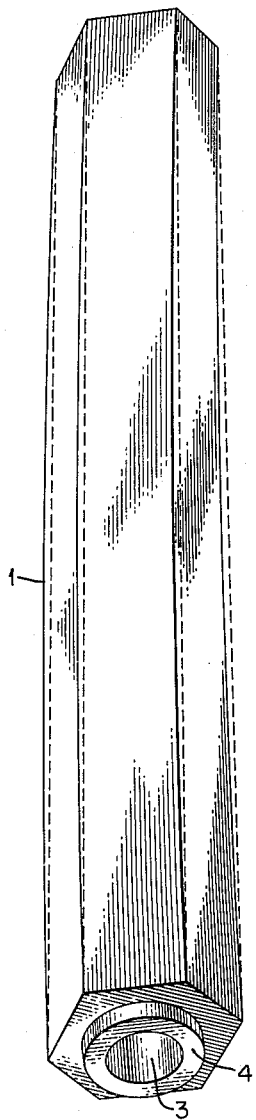
FIGURE 4 is an isometric view of a single unrestrained moderator block from that cluster of blocks.

To facilitate a more complete understanding of the invention, reference is made to the drawings which illustrate a reactor moderator structure embodying the principles of the present invention. Referring to FIGURES 1 and 4, which are, respectively, an elevation view, partially in section, of a reactor core embodying the present invention, and a perspective of a single bowed block from the core, a multiplicity of elongated, hexagonally-shaped graphite blocks 1 are stacked in layers upon an apertured steel supporting plate 2. Each block is penetrated vertically by a channel 3 of circular cross section, and the blocks are aligned vertically, by means of pilots 4 and recesses 5, to provide a series of continuous channels passing vertically through the entire structure. Each of these channels is aligned during reactor operation with an aperture 6 in supporting plate 2. Surrounding the structure is a cylindrical steel sleeve 7, formed by welding together the ends of a steel plate and machining to the desired inner diameter. Each block in the structure is shown, for illustrative purposes only, in a relaxed, bowed state. It is to be understood, however, that in the operating reactor the blocks are to be in a straightened, stressed condition. Under these conditions, the outer surface of sleeve 7 will be aligned with the edge of supporting plate 2, and channels 3 will be aligned with apertures 6, as was stated above.

Figure 2:
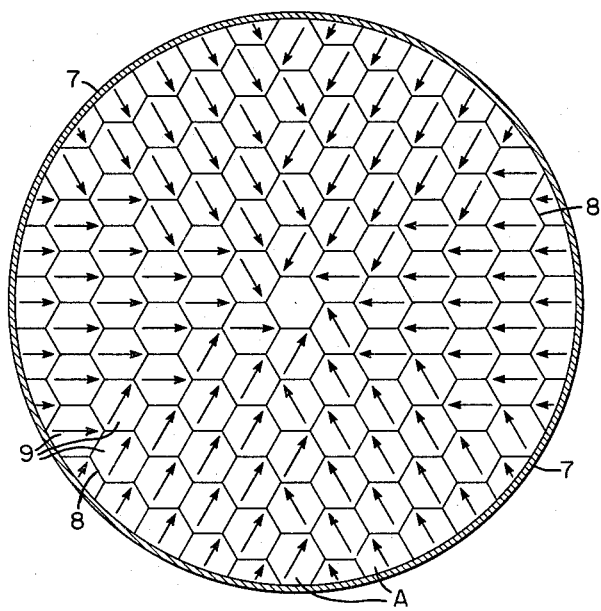
FIGURE 2 is a schematic plan view of that reactor moderator structure.
Figure 3:
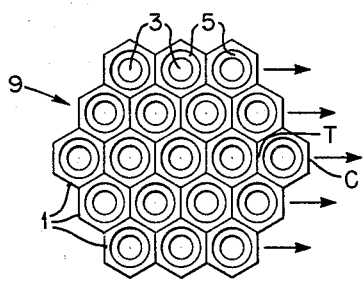
FIGURE 3 is a plan view of one cluster of blocks from the reactor moderator structure.

Referring now to FIGURES 2 and 3, which are, respectively, a schematic plan view of the reactor core, and a detail of a cluster of blocks from the core, the reactor is illustrated in accordance with the preferred mode of assembly. In FIGURE 2, the core is illustrated as being divided into a multiplicity of hexagonal regions 8, each of which is occupied by a cluster of blocks, such as the cluster 9 shown in FIGURE 3. Each cluster 9 is made up of nineteen bowed blocks 1, cemented together, as was described previously, while in a straightened condition. All blocks in each cluster were bowed in the same direction prior to assembly, the arrows of FIGURE 3 indicating the direction of the convex surfaces of the blocks prior to cementing.

Thus, each block in cluster 9 is, while in a straightened condition, under a tensile stress on its side which was concave prior to assembly and under a compressive stress on its opposite or convex side. Reference letters T and C in FIGURE 3 identify the stresses in a typical block of cluster 9.

The clusters thus formed are installed into a region 8 of the reactor core in such a manner that the sides of blocks which are in compression are aligned in the direction of the arrows of FIGURE 2. The temperature of the core is then raised to decompose the cement, thereby freeing the individual blocks to exert a lateral force on laterally contiguous blocks. Consequently, a lateral load, which is ultimately borne by peripheral sleeve 5, is imposed on the structure. It will be noted that the blocks in the core are oriented, as is preferred, so that they are in tension on a side in the direction of the periphery of the reactor and in compression on the opposite side.

To prolong the lifetime of the graphite blocks in the peripheral region of the reactor core, the blocks in the peripheral clusters, such as cluster A in FIGURE 2, are stressed to a greater degree than the blocks in the inner region. An inspection of the table set forth below will reveal the difference.

Returning to FIGURE 1, bearing in mind that during reactor operation the structure will be in a stressed condition rather than in the relaxed condition illustrated, it can be seen that differential dimensional changes will be automatically accommodated by the stressed structure. When, for example, the steel structure (i.e., sleeve 7 and plate 2) expands more in response to an increase in temperature than does the graphite moderator structure, the moderator structure being in a stressed condition will expand to accommodate the difference. It should be noted that channels 3 in blocks 1 will always remain in approximate alignment with apertures 6 in supporting plate 2. Moreover, differential dimensional changes, which are induced by radiation, will be similarly accommodated.

The table below gives the dimensions for components of a typical reactor moderator structure such as is illustrated in the drawings. It should be stressed that these dimensions are listed merely for illustrative purposes, and should not in any way be deemed as limiting the scope of the present invention. It should be apparent to those skilled in the art that the selection of these dimensions depends on such factors as the over-all size of the reactor, the coefficients of thermal expansion of the materials used, the strength and modulus of elasticity of the moderator material, and the anticipated operating conditions of the reactor.

Table

Size of moderator structure:
- Diameter _____ 15 ft.
- Height _____ 10 ft.

Material:
- Moderator _____ Graphite.
- Structural _____ Steel.

Moderator blocks:
- Material _____ Graphite.
- Length _____ 5 ft.
- Cross section _____ Hexagonal.
- Diameter (across flats) _____ 2.5 in.
- Magnitude of bow—
  - Inner zone _____ 0.06 in.
  - Outer zone _____ 0.12 in.
- Size of central channel _____ 1.5 in.

Peripheral sleeve:
- Material _____ Steel.
- Diameter—
  - O.D. _____ 15. ft. 4 in.
  - I.D. _____ 15 ft. 0 in.
- Height _____ 10 ft.
- Thickness _____ 2 in.

Diameter of moderator structure in unrestrained, bowed state _____ 15 ft. 5 in.
Lateral load in structure at room temperature _____ 70 lb./ft.$^2$.
Lateral load in structure at 1000° F. _____ 63 lb./ft.$^2$.

The above description of an embodiment of the invention was offered merely for illustrative purposes and should not be interpreted in a limiting sense. Many changes from and modifications of the illustration may be made without departing from the spirit and scope of the invention. For example, the hexagonal cross section of the illustrated moderator blocks is clearly not critical. Octagonal, circular, and square cross sections are, for example, equally suitable insofar as the present invention is concerned. Moreover, it should be obvious that the invention is applicable to any reactor structure wherein a difference exists between the coefficients of thermal expansion of the moderator material and the structural material, or differential dimensional changes occur as a result of exposure to irradiation. Thus, the invention is not limited to graphite and steel structures. In view of the inherent breadth of the invention, it is intended that its scope be limited only by the following claims.

Having thus described the invention, what is claimed is:

1. A method of fabricating a neutronic reactor moderator structure of stressed moderator blocks, which comprises providing a multiplicity of elongated moderator blocks, each of said blocks having a longitudinal bow, forming a multiplicity of stressed bundles of blocks by cementing together, with a thermally-sensitive cement, a multiplicity of blocks while in a straightened condition, installing the bundles thus formed into a restraining sleeve defining a fixed interior volume, and heating the resultant assembly to a temperature sufficient to remove said thermally-sensitive cement.

2. The method of claim 1 wherein said thermally-sensitive cement is methyl methacrylate.

3. The method of claim 1 wherein said blocks are formed from graphite.

4. As an article of manufacture, a neutronic reactor moderator structure fabricated according to the method of claim 1.

References Cited in the file of this patent

UNITED STATES PATENTS

| | | |
|---|---|---|
| 2,852,457 | Long et al. | Sept. 16, 1958 |
| 2,865,828 | Long et al. | Dec. 23, 1958 |
| 2,998,370 | Gaunt et al. | Aug. 29, 1961 |
| 3,020,226 | Hackney | Feb. 6, 1962 |

FOREIGN PATENTS

| | | |
|---|---|---|
| 847,122 | Great Britain | Sept. 7, 1960 |
| 1,198,353 | France | June 8, 1959 |

OTHER REFERENCES

Glasstone: Principles of Nuclear Reactor Engineering, 1955, pp. 172–174, 500, 501 and 638, D. Van Nostrand Co., Inc.